US011693765B2

(12) United States Patent
Uniyal et al.

(10) Patent No.: US 11,693,765 B2
(45) Date of Patent: Jul. 4, 2023

(54) UNIFIED REGRESSION PLATFORM FOR REGRESSION TESTING

(71) Applicant: SAP SE, Walldorf (DE)

(72) Inventors: Ajay Krishna Uniyal, Bangalore (IN); Sampathkumar S, Bangalore (IN); Christoph Birkenhauer, Kronau (DE)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 17/498,455

(22) Filed: Oct. 11, 2021

(65) Prior Publication Data

US 2023/0113263 A1 Apr. 13, 2023

(51) Int. Cl.
*G06F 11/36* (2006.01)
*G06F 16/23* (2019.01)
*G06F 8/65* (2018.01)

(52) U.S. Cl.
CPC ............ *G06F 11/3688* (2013.01); *G06F 8/65* (2013.01); *G06F 11/3664* (2013.01); *G06F 11/3684* (2013.01); *G06F 11/3692* (2013.01); *G06F 16/2379* (2019.01)

(58) Field of Classification Search
CPC .. G06F 11/36; G06F 11/3688; G06F 11/3692; G06F 11/3684; G06F 11/3664
See application file for complete search history.

(56) References Cited

U.S. PATENT DOCUMENTS

| | | | | |
|---|---|---|---|---|
| 7,506,312 | B1 * | 3/2009 | Girolami-Rose | G06F 8/71 717/124 |
| 10,496,530 | B1 * | 12/2019 | Angermayer | G06F 11/3692 |
| 10,705,810 | B2 * | 7/2020 | Fuchs | G06F 11/3692 |
| 10,776,254 | B1 * | 9/2020 | Dhayanithi | G06F 11/3664 |
| 11,023,361 | B1 * | 6/2021 | Singh | G06F 9/5027 |
| 11,513,944 | B1 * | 11/2022 | Oguara | G06F 11/3692 |
| 2019/0310931 | A1 * | 10/2019 | Ocariza, Jr. | G06F 11/3466 |
| 2019/0362228 | A1 * | 11/2019 | Sato | G06N 3/08 |
| 2020/0371905 | A1 * | 11/2020 | Dhayanithi | G06F 11/3688 |
| 2021/0165763 | A1 * | 6/2021 | Banerjee | G06F 16/1734 |
| 2022/0019523 | A1 * | 1/2022 | Dhayanithi | G06Q 30/0201 |
| 2022/0067548 | A1 * | 3/2022 | Juay | G06N 5/04 |
| 2023/0025441 | A1 * | 1/2023 | Oguara | G06F 11/3676 |

* cited by examiner

*Primary Examiner* — Kamini B Patel
(74) *Attorney, Agent, or Firm* — Fountainhead Law Group P.C.

(57) ABSTRACT

Systems, methods, and computer-readable media are disclosed for unified regression testing. A first set of inputs configured to test a first scenario and a second set of inputs configured to test a second scenario may be received from a user. The first set of inputs may be used to generate a first set of outputs, and the second set of inputs may be used to generate a second set of outputs. A software update may be received. The first set of outputs may be regenerated using the first set of inputs, and the second set of outputs may be regenerated using the second set of inputs. The regenerated first set of outputs may be compared against the first set of outputs, and the regenerated second set of outputs may be compared against the second set of outputs. The comparison results may then be displayed to the user.

20 Claims, 4 Drawing Sheets

FIG. 2

UNIFIED REGRESSION PLATFORM FOR REGRESSION TESTING

TECHNICAL FIELD

Embodiments generally relate to a unified regression platform for regression testing. More specifically, embodiments relate to systems and methods for automatically performing regression testing on statutory reports.

RELATED ART

Organizations are often required to submit various statutory reports, such as tax documents, to legal authorities for their review. Typically, organizations rely on software from a vendor to automatically generate the statutory reports on a recurring basis. The underlying software used to generate the statutory reports often changes when a new version of the software is shipped. Additionally, new software updates may come with undetected and unforeseen bugs that are difficult to capture before shipping. These bugs may result in errors in the generation of the statutory reports even if the software update did not change the underlying code for the generation of the statutory reports. Consequently, organizations often spend many hours reviewing the reports and manually performing regression testing to ensure compliance; an inaccurate report may lead to substantial fines for the organizations. To perform regression testing, organizations manually regenerate the relevant files and manually compare the regenerated files to known, good reference files. Further, because the statutory reports often comprise a broad range of technical file formats (e.g., CSV, JSON, XML, etc.), manually reviewing the documents is often cumbersome due to the effort required to understand the technical syntax.

Accordingly, a need exists for an automated regression testing platform for automating regression testing on files to substantially reduce the manual labor cost to ensure accurate generation of the files.

SUMMARY

Disclosed embodiments address the above-mentioned problems by providing systems and methods for an automated unified regression platform. A first set of reference inputs and a second set of reference inputs for regression testing may be received. The first set of reference inputs may be configured to test a first scenario, and the second set of reference inputs may be configured to test a second scenario. The first set of reference inputs may be used to generate a first set of reference outputs. The second set of reference inputs may be used to generate a second set of reference outputs. The first set of reference outputs and the second set of reference outputs may represent sets of outputs known to be correct; as such, the first and second set of reference outputs may be used as a baseline for regression testing. A software update may be received at a user computing device. To ensure the software update did not affect the generation of the outputs, regression testing may be performed. The first set of reference outputs and the second set of reference outputs may be automatically regenerated using the first set of reference inputs and the second set of reference inputs, respectively. The regenerated first set of reference outputs may be compared to the first set of reference outputs, and the regenerated second set of reference outputs may be compared to the second set of reference outputs. Differences between the corresponding sets of reference outputs may be indicative of issues caused by the software update. The comparison results may be presented via a user interface. Users may also be presented with a side-by-side view of the comparison results to identify the differences between the source code used for generating the outputs.

A first embodiment is directed to a computer-implemented method for unified regression testing, the computer-implemented method comprising receiving, from a user, a first set of reference inputs for regression testing, the first set of reference inputs configured to test a first scenario, in response to receiving the first set of reference inputs, generating a first set of reference outputs using the first set of reference inputs, receiving, from the user, a second set of reference inputs for regression testing, the second set of reference inputs configured to test a second scenario, in response to receiving the second set of reference inputs, generating a second set of reference outputs using the second set of reference inputs, receiving, at a computing system associated with the user, a software update, in response to receiving the software update, regenerating the first set of reference outputs using the first set of reference inputs to obtain a regenerated first set of reference outputs, and regenerating the second set of reference outputs using the second set of reference inputs to obtain a regenerated second set of reference outputs, comparing the regenerated first set of reference outputs to the first set of reference outputs to determine if the software update affected the regeneration of the first set of reference outputs and to obtain a first set of comparison results, comparing the regenerated second set of reference outputs to the second set of reference outputs to determine if the software update affected the regeneration of the second set of reference outputs and to obtain a second set of comparison results, and providing, to the user, the first set of comparison results and the second set of comparison results.

A second embodiment is directed to one or more non-transitory computer-readable media storing computer-executable instructions that, when executed by a processor, perform a method for unified regression testing, the method comprising receiving, from a user, a first set of reference inputs for regression testing, the first set of reference inputs automatically generated for the user and configured to test a first scenario, in response to receiving the first set of reference inputs, generating a first set of reference outputs using the first set of reference inputs, receiving, from the user, a second set of reference inputs for regression testing, the second set of reference inputs automatically generated for the user and configured to test a second scenario, in response to receiving the second set of reference inputs, generating a second set of reference outputs using the second set of reference inputs, receiving, at a computing system associated with the user, a software update, in response to receiving the software update, regenerating the first set of reference outputs using the first set of reference inputs to obtain a regenerated first set of reference outputs, and regenerating the second set of reference outputs using the second set of reference inputs to obtain a regenerated second set of reference outputs, comparing the regenerated first set of reference outputs to the first set of reference outputs to determine if the software update affected the regeneration of the first set of reference outputs and to obtain a first set of comparison results, comparing the regenerated second set of reference outputs to the second set of reference outputs to determine if the software update affected the regeneration of the second set of reference outputs and to obtain a second set of comparison results, and providing, to the user, the first set of comparison results and the second set of comparison results.

A third embodiment is directed to a system for unified regression testing, the system comprising a processor, a database, and one or more non-transitory computer-readable media storing computer-executable instructions that, when executed by the processor, perform a method for unified regression testing, the method comprising receiving, from a user, a first set of reference inputs for regression testing, the first set of reference inputs configured to test a first scenario, in response to receiving the first set of reference inputs, generating a first set of reference outputs using the first set of reference inputs, receiving, from the user, a second set of reference inputs for regression testing, the second set of reference inputs configured to test a second scenario, in response to receiving the second set of reference inputs, generating a second set of reference outputs using the second set of reference inputs, receiving, at a computing system associated with the user, a software update, in response to receiving the software update, regenerating the first set of reference outputs using the first set of reference inputs to obtain a regenerated first set of reference outputs, and regenerating the second set of reference outputs using the second set of reference inputs to obtain a regenerated second set of reference outputs, comparing the regenerated first set of reference outputs to the first set of reference outputs to determine if the software update affected the regeneration of the first set of reference outputs and to obtain a first set of comparison results, comparing the regenerated second set of reference outputs to the second set of reference outputs to determine if the software update affected the regeneration of the second set of reference outputs and to obtain a second set of comparison results, and providing, to the user, the first set of comparison results and the second set of comparison results.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 2 illustrates a dashboard for the unified regression platform for certain embodiments;

Figure 1:
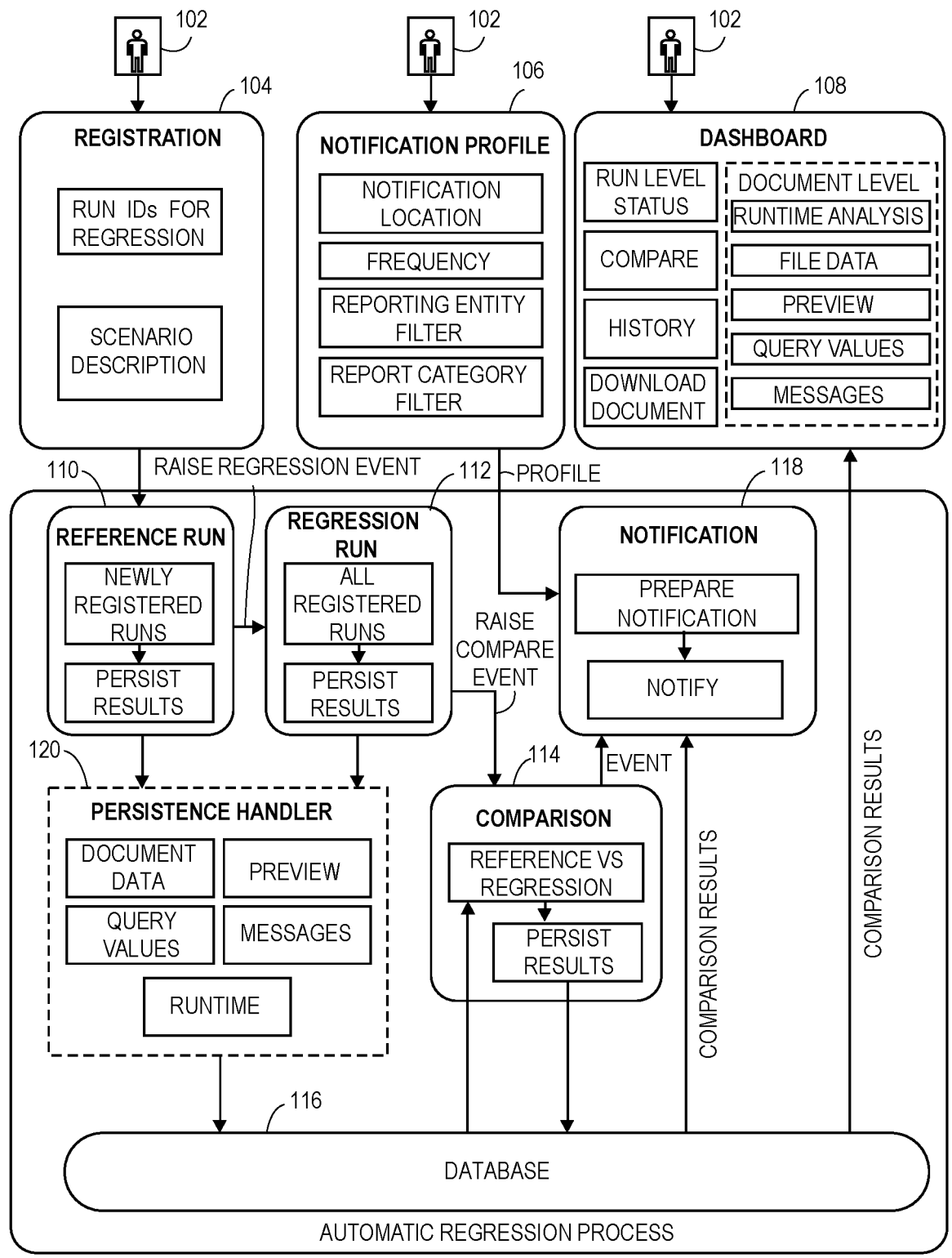
FIG. 1 illustrates an overview of a unified regression platform for certain embodiments.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Systems and methods for a unified regression platform for regression testing of reports are described herein. Regression testing may be performed on reports to detect errors in the generation of the reports. In some embodiments, the reports are statutory reports that may comprise a plurality of files, with the plurality of files being provided in various file formats. The regression testing may be performed automatically in response to a software update, on a recurring basis, or initiated manually by a user. In some embodiments, the regression testing comprises at least one of positive regression testing, negative regression testing, non-negative impact regression testing, or any other type of regression testing. The regression testing may comprise creating and storing a reference report comprising outputs that are known to be correct when generated using a set of inputs. The reference report may be regenerated using the same set of inputs to obtain regenerated outputs. The regenerated outputs may be compared against the reference outputs. If there are any differences between the two sets of outputs, an alert may be sent to a user. In some embodiments, the regenerated outputs and the reference outputs are converted to a common format for the comparison. The reference report may be tested on various complexity levels to ensure all of the underlying software for generating the reference report is tested. For example, a first set of inputs may be configured to test a base-level logic of the report, while a second set of inputs may be configured to test a high-level logic of the report such that substantially all input scenarios may be tested by the unified regression platform.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present disclosure in sufficient detail to enable those skilled in the art to practice the associated teachings. Other embodiments can be utilized, and changes can be made without departing from the scope of the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

FIG. 1 illustrates unified regression platform 100 for the unified regression platform in some embodiments. Unified regression platform 100 may be administered by one or more users 102 as shown for performing regression testing. In some embodiments, unified regression platform 100 is configured to perform various types of regression tests, such as positive, negative, non-negative, or any combination thereof. In some embodiments, unified regression platform 100 is configured to interface with various services, such as a Document Management System (DMS) for retrieving documents and/or a database querying service (e.g., SQL and the like) for performing database queries.

In some embodiments, users 102 configure at least one of registration 104, notification profile 106, or dashboard 108 for unified regression platform 100. Registration 104 may comprise the registering of run IDs for regression testing. Run IDs may define test scenarios for testing reference runs 110. For example, a test scenario defined by a run ID may comprise which reports to regression test, which outputs to compare, how often to perform regression testing, a notification procedure, or any combination thereof. In some embodiments, the test scenarios are defined by user 102 and/or pre-defined within unified regression platform 100. In some embodiments, the test scenarios comprise associated reference runs 110 for regression testing. In some embodiments, run IDs may be used to group a set of reference reports into a test suite for regression testing using a shared set of reference inputs. As will be discussed in further detail below, once the reports are regenerated, the reference outputs from reference runs 110 may be compared against the outputs from the regenerated reports to determine if the file logic was affected by the software update or change.

As shown, registration 104 may comprise assigning run IDs for each report that user 102 wishes to be regression tested. When registering run IDs, user 102 may also provide a description for the regression testing to provide additional details on the testing. In some embodiments, an initial report generation of reports in a newly registered run ID is undertaken and the inputs and outputs stored as reference inputs and outputs for regression testing future versions of the reports.

Reference runs 110 may comprise the baseline set of reports, reference inputs, and the known, good outputs to which the regenerated outputs are compared against during regression testing. For example, reference runs 110 may comprise a generated report that was accepted by the presiding authority to which the report was submitted. In some embodiments, reference runs 110 are specified by user 102. For example, user 102 may elect for regression run 110 to only comprise reports created by user 102. In some embodiments, unified regression platform 100 suggests various reports to use as reference runs 110 based on their acceptance by the presiding authority. In some embodiments, reference runs 110 may be provided by the software vendor or an associated entity, such as the presiding authority themselves, a consulting firm, or the like. As will be discussed with respect to FIG. 2, each report in reference runs 110 may be associated with a reporting category, a reporting entity, the run ID, or any combination thereof.

As described above, reports in reference run 110 may comprise a set of reference inputs and a set of reference outputs for the report. For example, a reference input may be an employee's gross salary, and a reference output may be the federal taxes owed by the employee. The report may comprise the underlying logic used to determine the federal taxes from the gross salary. As such, when the report is regression tested at regression run 112, the report may be regenerated using the same set of reference inputs, and the regenerated set of reference outputs may be compared against the original set of reference outputs. Thus, if the regenerated set of reference outputs matches the set of reference outputs, user 102 may have confidence that underlying software is still working correctly. In some embodiments, a single report may be regression tested with multiple sets of reference inputs to test substantially all of the logic used for generating the report. In some embodiments, reference runs 110 are selected by user 102. In some embodiments, reference runs 110 are automatically selected for user 102. If user 102 submits a report and the report is accepted, unified regression platform 100 may add the report to reference runs 110. Therefore, in some embodiments, reference runs 110 may store and be updated with the most recently accepted reports. Similarly, in some embodiments, reference inputs may be automatically generated for user 102. For example, the software vendor or the presiding authority may provide a set of reference inputs to be used for regression testing that are known to test substantially all of the logic of the files in the report.

In some embodiments, reports are generated automatically for user 102. Each report may comprise a plurality of files, and each file in a report may comprise various technical file formats (e.g., JSON, CSV, TXT, XML, etc.). Reports in reference runs 110 may be generated according to report definitions comprising a predefined format and/or a metadata definitions file (e.g., XSD or JSON file). The metadata definitions may contain mappings from data fields in a database associated with an application, such as an accounting or payroll application, where the mapping defines relationships between the data fields and fields in the generated reports. In some embodiments, the mapping defines the relationship between an employee's salary in a payroll application and corresponding salary entry in the generated reports, for example. In some embodiments, the report definitions may define a generated file name for each file in the report, along with the logic to apply to the reference inputs used for generation of each file in the report. In some embodiments, the report definitions for generating reports are provided by the software vendor. In some embodiments, users 102 can configure their own report definitions to generate custom reports and/or modify the report definitions delivered by the software vendor.

The report definitions may also define the file format in which a file in the report is to be generated. As described above, the files may comprise various technical file formats which may be converted to a common file format or programming language. In some embodiments, the conversion to a common formation (file or programming) allows for comparison of inputs, file logic, and outputs across differing technical formats. To facilitate comparison between reference runs 110 and reference runs 112, it may be necessary to convert the files to a common intermediate format. In some embodiments, conversion of files to a common intermediate format is performed by extracting various metadata from the files, such as the metadata provided by the metadata definitions file. For example, the metadata file may define which data values in the report correspond to which data labels. Returning to the above example, by knowing metadata relating to which data value corresponds to the employee's salary entry, the file may be converted to a common file format irrespective of the originating file format. Therefore, using the metadata definitions, data values can be mapped to data labels and converted to a common intermediate format. As such, reference runs 110 may be efficiently compared to regenerated runs 112 to determine if a shipped software update or other change affected the generation of the reports. Once the comparison is done, the reference outputs may be converted back to their originating format. Other example metadata which may be provided by way of metadata definitions includes, but is not limited to, a file name, a file type, a file size, a creator, a file created data, a time stamp, and the like.

After defining reference runs 110 at registration 104, a regression event may be raised that causes regression run 112 to be executed. In some embodiments, the regression event is a received software update associated with unified regression platform 100. As described above, the reports may comprise a statutory report which an individual or an organization is required to submit to a presiding authority. For example, the statutory report may be an IRS Form 720 for a quarterly excise tax return, a payroll sheet, or the like. Errors in the statutory report may lead to substantial fines and penalties for the organization. Reports may be generated for user 102 on a recurring basis, such as daily, weekly, monthly, quarterly, or yearly. Because rules and regulations relating to the various statutory reports frequently change, it is important for organizations to ensure that newly generated reports adhere to the most recent rules and regulations for the associated statutory report. Further, as described above, shipped software updates for the underlying software implemented unified regression platform 100 may cause unforeseen changes to the automatic generation of reports. The generation of reports may be affected even if the software update does not change the underlying code for the generation of the report. As such, it may be necessary to perform regression tests on generated reports to ensure software updates do not affect the generation of the statutory reports.

To perform regression testing and ensure reports are generated correctly, regression run 112 may be configured to perform regression testing on reports associated with the run IDs defined at registration 104 as described above. In some embodiments, regression run 112 is configured to run recurringly as described above. In some embodiments, each run ID defined at registration 104 comprises a defined schedule for which associated reports are to be tested. In some embodiments, regression runs 112 for run IDs without a defined schedule are only tested when a new software update is implemented. For example, user 102 may define a run ID such that reports generated according to report definitions delivered by the software vendor are regression tested when a new software update is delivered, while reports generated according to report definitions configured by user 102 are tested both on a weekly basis and in response to a new software update. In some embodiments, users 102 can manually initiate regression testing.

In some embodiments, once regression run 112 regression tests all relevant run IDs, a compare event is raised, and comparison 114 compares relevant file attributes between the reference reports and the regenerated reports. In some embodiments, comparison 114 comprises comparing file attributes selected from at least one of the file content, the file name, a file preview, file messages, analytics, or runtime for regression run 112 as will be discussed further below with respect to FIG. 2. In some embodiments, a comparison 114 failure of any of the file content, the file name, the preview, messages, analytics, or runtime results in an overall failure of regression run 112. In some embodiments, users 102 can define a threshold of file attributes that must fail comparison 114 in order for regression run 112 to be considered a failed run. As illustrated, database 116 may provide stored reference outputs from reference run 110 to comparison 114 for comparison against the regenerated reference outputs. In some embodiments, comparison 114 stores the comparison results in database 116. In some embodiments, the comparison results are stored in a persistence layer of database 116.

In some embodiments, users 102 configure notification profile 106 for receiving notifications of completed comparisons 114. Users 102 may configure notification profile 106 to define a notification location, a frequency, and various filters. In some embodiments, users 102 can select at least one notification location, such as an email address or a phone number, at which to receive results of comparison 114. Users 102 may also define a frequency for receiving notifications. In some embodiments, if the frequency for notification profile 106 differs from the frequency at which regression runs 112 are performed, users 102 will receive a summary of all regression runs 112 performed since the last notification. In some embodiments, notification profile 106 is configured to have the same frequency as the frequency of regression run 112, such that user 102 is notified of regression test results each time a run ID undergoes regression testing. In some embodiments, users 102 can configure the format in which the report results are retrieved. For example, users 102 may specify that the regression reports are sent via email in a PDF document, or as an SMS comprising a link to a spreadsheet of results saved to a cloud platform. In some embodiments, users 102 can also configure authorization settings for the notification, such as requiring a password, two-factor authorization, multi-factor authorization, or the like to view the regression results. In some embodiments, users 102 can configure notification profile 106 to be notified of regression runs 112 based on a state of regression runs 112. Example states for regression runs 112 include, but are not limited to, pending, in progress, or completed. In some embodiments, users 102 may choose to only be notified of erroneous or failed runs. As illustrated, users 102 may also configure notification profile 106 to filter regression results by reporting entities and/or reporting categories as will be discussed further below with respect to FIG. 2. In some embodiments, users 102 can filter results by run IDs, as well. For example, users 102 can elect to be notified of all regression tests having a run ID of "1" every Friday and all regression tests having a reporting entity of "AE_R-EP_ENT" daily. Once the comparison results are obtained, comparison 114 may retrieve the results from database 116 and send the results to notification 118 for preparation and transmission of the notification according to notification profile 106. Comparison 114 may also retrieve the comparison results from database 116 and send the comparison results to dashboard 108 for display as described above with respect to FIG. 2.

As illustrated, at least one of reference run 110, regression run 112, or comparison 114 may persist their associated data to persistence handler 120. In some embodiments, persistence handler 120 comprises a persistence layer of database 116 for which data for unified regression platform 100 is stored. In some embodiments, persistence handler 120 stores at least one of the file content, data for the file preview, query values, file messages, and data for runtime 228 for reference runs 110 and/or regression runs 112. In some embodiments, the document data comprises file content, such as data values from the file, file metadata (e.g., the file name), a structure for the file, reference inputs and outputs, or any combination thereof. In some embodiments, persistence handler 120 allows for object-relational mapping to map data objects from files to relational data. In such a manner, persistence handler 120 may facilitate the conversion of files to the common file or programming format for comparison 114 to compare the reference outputs to the regenerated outputs. In some embodiments, persistence handler 120 serves as a data modeling infrastructure for generating data models comprising semantic information used to convert files to the common format.

In some embodiments, persistence handler 120 stores queries form user 102. In some embodiments, users 102 can define queries for retrieving data. In some embodiments, queries can be written in SQL or other similar query formats. Queries may be used for retrieving data from database 116 to create files that is required for reporting to reporting entities 206. For example, a query may be written to retrieve reference runs 110 from database 116 to facilitate comparison 114 to the regenerated reference outputs.

Once the regression results are ready to be reported to user 102, notification 118 may prepare the notification message for transmitting to the user 102. As described above, the notification message may be based off a stored template. The notification may further comprise formatting the regression test results, such as into a table.

Figure 2:
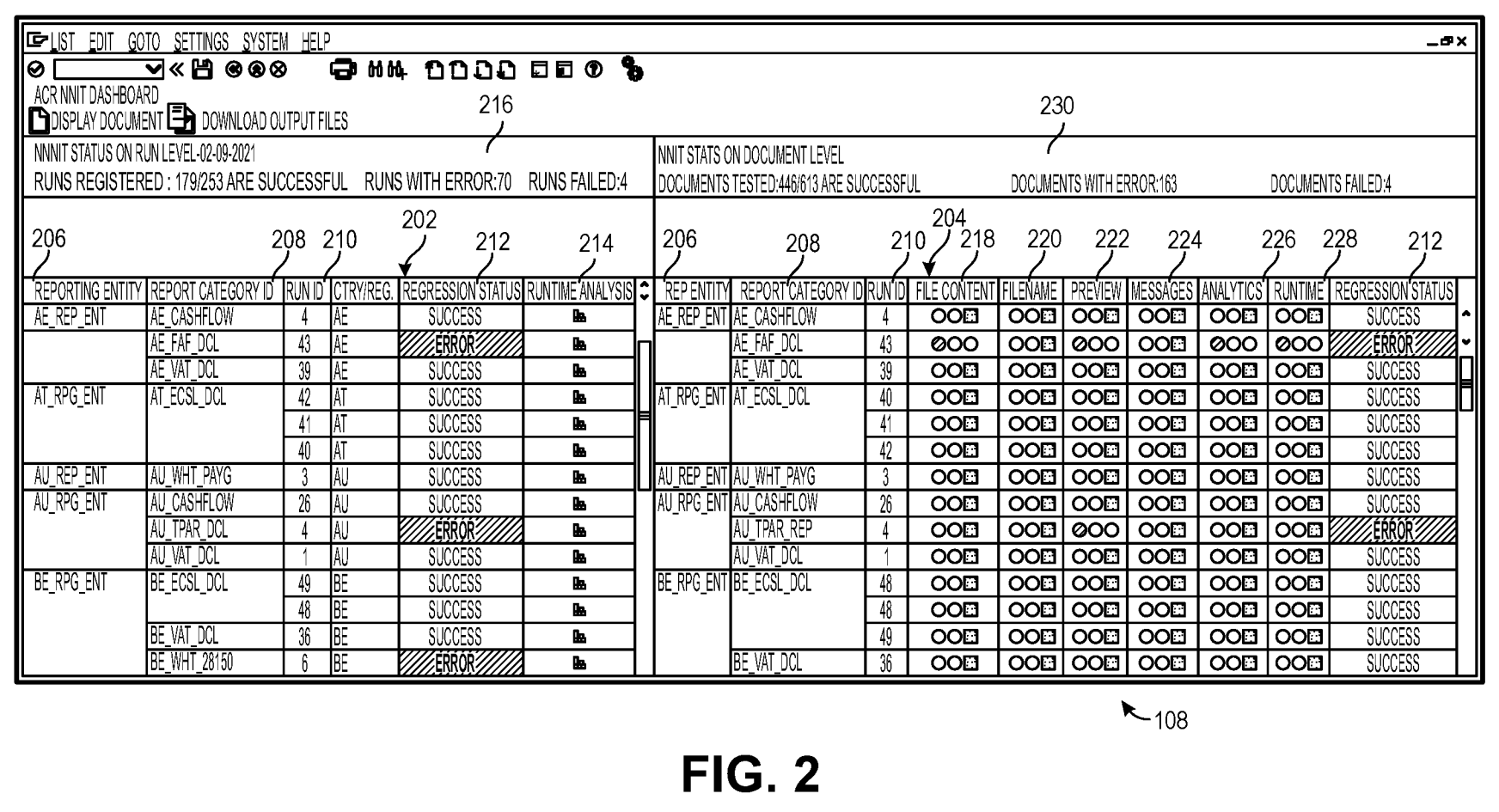

FIG. 2 illustrates dashboard 108 for displaying an overview of regression testing for some embodiments. In some embodiments, dashboard 108 comprises various panes for displaying regression results and various information related to regression testing. In some embodiments, dashboard 108 comprises a run-level pane 202 and a document-level pane 204. Run-level pane 202 may display regression results at a run-level while document-level pane 204 may display regression results at a document-level. Each run may comprise regression testing of multiple documents. In some embodiments, dashboard 108 is configurable by user 102 and the various panes, columns, rows, and user interface elements may be shifted, hidden, or otherwise manipulated as desired.

In some embodiments, reports may be grouped for regression testing. Reports may be categorized according to at least one of reporting entity 206, reporting category 208, or run IDs 210. Reporting entity 206 may define an associated reporting authority to which the generated report is to be submitted. Reporting entity 206 may also be any entity with whom the report generating user engages in common activities, such as a business partner. As an additional example, each country may have a tax authority for submitting tax documents representative of reporting entity 206. Reporting category 208 may define a category for the report, such as a cashflow document or a payroll document. Run IDs 210 may define how the reports falling under the hierarchy defined by reporting entity 206 and reporting category 208 are to be regression tested. For example, run ID 210 may define a set of reference inputs to use for generating the set of reference outputs. In some embodiments, run ID 210 may define multiple sets of reference inputs for report generation to test various complexity levels of the report logic. In some embodiments, a separate run ID 210 is used for each separate set of reference inputs for report generation. As such, a report may be regression tested with multiple run IDs 210 to ensure all the underlying logic is sufficiently tested. In some embodiments, run IDs 210 define test scenarios for testing reports in regression runs 110 as described above. In some embodiments, run IDs 210 define test suites for testing a batch of reports with the same set of reference inputs. In some embodiments, reporting entity 206 and reporting category 208 are omitted, and reports are only regression tested according to their associated run ID 210.

While embodiments are described herein with reference to regression testing for reports submitted to a presiding authority, it should be noted that embodiments are not limited to regression testing such report types. Broadly, embodiments may regression test files generated for various purposes while providing a unified regression platform 100 for comparing reports comprising files in different file formats. For example, a restaurant may utilize scheduling software for generating a schedule for employees to ensure the restaurant is adequately staffed at all times. The scheduling software may generate schedules according to various constraints, such as having 20 employees scheduled during the dinner rush. The restaurant may use the unified regression platform 100 described herein to regression test the scheduling software and ensure the schedule is correctly being generated according to the defined constraints. As another example, a company may rely upon a software program that utilizes web scraping to pull data from various websites on a daily basis for automatic generation of a report. To ensure that the web scraping is working properly, the unified regression platform 100 may be used to regression test a new report and compare the outputs to a reference report.

Returning now to FIG. 2, as illustrated, run-level pane 202 may also display regression status 212. In some embodiments, regression status 212 indicates whether a run succeeded, failed, or was erroneous. A successful run may be a run in which comparison 114 found no differences between the reference outputs and the regenerated outputs. In some embodiments, users 102 can define what constitutes a successful run, such as a threshold number of regenerated outputs that need to be successfully matched to the reference outputs. In some embodiments, an erroneous run is a run which comparison 114 found at least one difference between the reference outputs and the regenerated outputs. In some embodiments, a failed run is a run in which at least one of the outputs for the generated report failed to be generated. In some embodiments, a cell in regression status 212 is color-coded based on a success, failure, or error, such as green for a success and red for a failure or error.

Users 102 may also be able to view various runtime data for run IDs 210 via runtime analysis 214. When actuated, runtime analysis 214 may open a separate window or pane and display various statistics for the regression test. Runtime analysis 214 may display the history of previous regression tests associated with the selected report. For example, runtime analysis 214 may display the run date, the runtime, regression status 212, reporting entity 206, reporting category 208, run ID 210, or any combination thereof.

Run-level pane 202 may comprise run summary 216 displaying summary information for all regression-tested reports in some embodiments. As shown, run summary 216 may display various run-related information, such as a run date, a number of successful runs, a number of failed runs, a number of erroneous runs, and other like data. In some embodiments, run summary 216 is configurable by user 102 such that user 102 can select which data is displayed in run summary 216.

Looking now at document-level pane 204, a more detailed display of regression testing results is displayed for some embodiments. As described above, run IDs 210 may define regression testing parameters for multiple reports, and each file in the report may be displayed in document-level pane 204. In some embodiments, document-level pane 204 displays reporting entity 206, reporting category 208, run ID 210, and regression status 212. Document-level pane 204 may further display results of comparison 114 for various file-level attributes, such as file content 218, file name 220, preview 222, messages 224, analytics 226, runtime 228, or any combination thereof. In some embodiments, the file-level attributes have associated indicators to indicate if the comparison 114 for the attribute failed. The indicators may comprise bubbles as shown, checkboxes, textual indicators, and the like. For example, a failed or erroneous document may be indicated by filling in the leftmost bubble, and a successfully regenerated document may be indicated by filling in the rightmost bubble under the corresponding file attribute (i.e., file content 218, file name 220, preview 222, messages 224, analytics 226, or runtime 228). In some embodiments, file-level attributes can be compared to thresholds, and the middle bubble can be used to indicate a middle threshold level. For example, a runtime 228 comparison may be considered a failure if runtime 228 increased by greater than 50% from reference runs 110 to the regenerated run but only be considered a partial failure if runtime 228 increased by greater than 25% but less than 50%. In some embodiments, comparison 114 results can be configured into multiple thresholds to provide users 102 a more detailed view of the results.

As described above, to determine if a report was successfully regression tested, the regenerated outputs may be compared against the outputs from reference runs 110. In some embodiments, the outputs are selected from at least one of file content 218, file name 220, preview 222, messages 224, analytics 226, runtime 228, or any combination thereof.

In some embodiments, file content 218 comprises any content associated with the file, such as the layout and the generated data values. For example, if the file is for an IRS form, comparison 114 of file content 218 may check if the form was generated according to a correct layout of the form. Comparison 114 of file content 218 may also check that each data field in the file was filled in correctly. Additionally, or alternatively, comparison 114 of file content 218 may also comprise a comparison to ensure that file headers, file footers, and the like match between the reference runs 110 and the regenerated files. In some embodiments, comparison 114 of file name 220 checks if the regenerated file name matches the file name for the reference run 110. In some embodiments, a change to the regulations set by a reporting entity 206 for generating a file may result in a change of the required file name. As such, in some embodiments, the file name 220 may be configured to check if the regenerated file name 220 matches a known, correct file name rather than the file name stored in reference runs 110.

In some embodiments, unified regression platform 100 is further configured to generate a graphical preview 222 of the generated file for display to user 102. In some embodiments, the preview 222 is generated based on the metadata definitions described above. The preview 222 may allow for user 102 to view data from the generated file in an understandable manner rather than having to attempt to interpret a complex file, such as a TXT file, in which the data may be represented as a complex string of alphanumeric data. As such, in some embodiments, the preview 222 for the regenerated file is compared against the preview 222 generated for the corresponding file in reference runs 110. If the previews 222 differ, the regenerated run may be considered erroneous. In some embodiments, comparison 114 of preview 222 comprises comparing the various user interface elements generated for preview 222. For example, comparison 114 may be made to determine if the data labels for the data values in the files is the same for the reference preview 222 and the regenerated preview 222. In some embodiments, comparison 114 of preview 222 comprises comparing the data from the file which is to be displayed to the user. If there is a mismatch between the data presented in preview 222, the regression run 112 may be considered to have failed.

In some embodiments, comparison 114 also compares messages 224. In some embodiments, messages 224 comprise messages generated during file or report generation. Messages 224 may be a part of the legal requirement for generating files for statutory reporting in some embodiments; as such, it may be necessary to compare messages when regression testing. In some embodiments, the report definitions defines various messages that are to be generated and, optionally, transmitted during generation. For example, log and/or processing messages may be configured to document the generation of files. In some embodiments, files may be configured to generate messages 224 that are sent to users 102 upon completion. In some embodiments, reports are configured to create an error message if an error is detected during generation of the reports. In some embodiments, if an error message is generated, the regression test may automatically be considered as a failed run. If messages 224 between the regenerated report and the reference run 110 do not match an error may be thrown for regression status 212.

In some embodiments, comparison 114 compares analytics 226 between reports. Analytics 226 may comprise various data related to report generation. as described above, to generate reports, data may be pulled from various sources, such as databases and files. For example, the data retrieved may comprise multiple files and tables storing data, along with an associated company code, a customer vendor name, and the like. To retrieve the data, database queries (e.g., table queries, views, SQL queries, etc.) may be use. For comparison 114 of analytics 226, the retrieved data may be compared between reference runs 110 and the regression run 112. If there is a mismatch, such as the query for the regenerated report not querying a file present in the reference run 110, comparison 114 may fail. In some embodiments, the query inputs are compared between reference run 110 and the regression run 112. In some embodiments, queries can be tied to a single file in a report, or a single query can be re-used for multiple files in a report and/or multiple reports.

Comparison 114 may also compare runtimes 228 for generating the reports. In some embodiments, users 102 can configure thresholds for runtime 228. For example, user 102 may define that a greater than 50% difference in runtime 228 between the reference run 110 and the regenerated report is required to cause a regression test failure. In some embodiments, users 102 can configure multiple thresholds for runtime 228 for a report. For example, user 102 may configure runtime differences between 25% and 50% to cause an alert, but not indicate a regression test error.

In some embodiments, unified regression platform 100 is configured to track reports that were considered for reporting to a reporting entity 206. As described above, data may be pulled from various files and/or databases and used as reference inputs for report generation. In some embodiments, these tracked reports may be stored and compared when performing regression testing. As such, users 102 may be alerted if reports were omitted from consideration when regression testing.

Document-level pane 204 may also comprise document summary 230 displaying summary information for all regression-tested files. As shown, document summary 230 may display various document-related information, such as a number of successfully tested documents, a number of failed documents, a number of erroneous documents, and other like data. In some embodiments, document summary 216 is configurable by user 102 such that user 102 can select which data is displayed in document summary 216.

In some embodiments, dashboard 108 is configured to display the underlying software used to generate the reports. In some embodiments, dashboard 108 displays the code for both reference run 110 and the regenerated run side-by-side such that user 102 can easily compare the two files. As previously described, the technical files may be converted to a common file format to easily facilitate the comparison therebetween. In some embodiments, unified regression platform 100 is configured to highlight lines or sections of the underlying code which differ between reference run 110 and the regenerated run.

Figure 3:
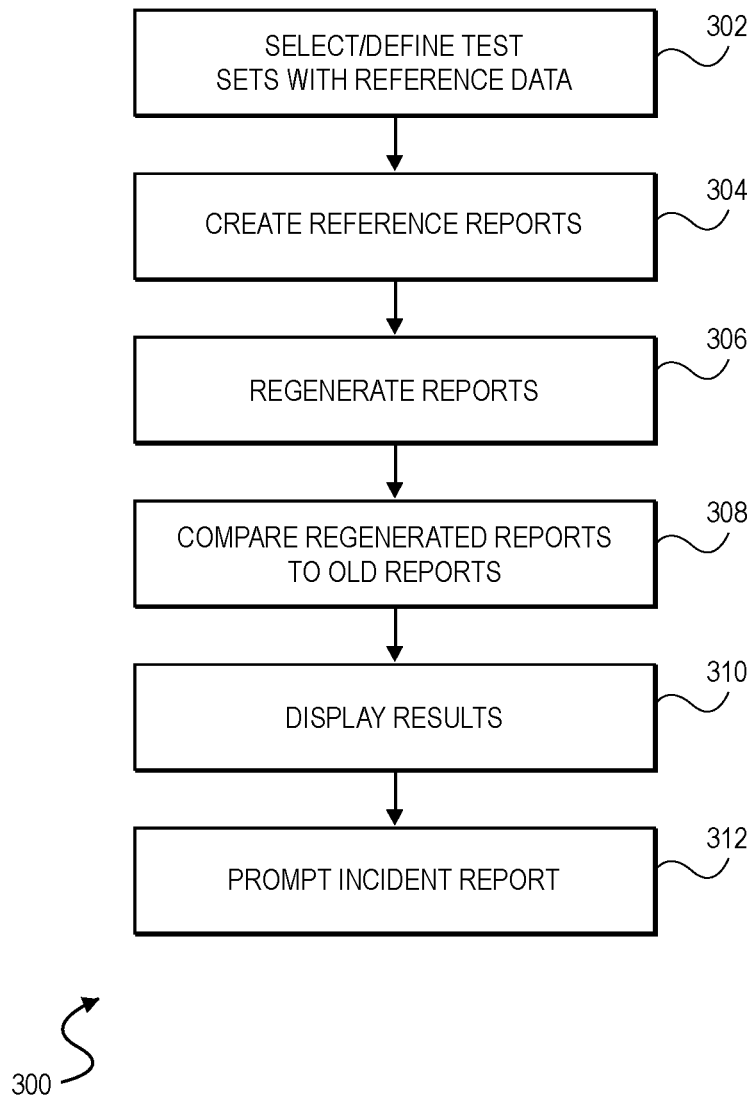
FIG. 3 illustrates an exemplary flow chart for the unified regression platform for certain embodiments.

FIG. 3 illustrates an exemplary method 300 for regression testing reports for some embodiments. At step 302, reference runs 110 may be selected and/or defined. As described above, users 102 may select various reports to use as references. In some embodiments, unified regression platform 100 suggests or defines reports to be used as references for user 102. For example, unified regression platform 100 may select reports accepted by reporting entity 206 to use as reference runs 110. In some embodiments, unified regression platform 100 is configured to update reference runs 110 after the acceptance of a report, such that reference runs 110 comprise the most up-to-date reports.

Next, at step 304, reference runs 110 may be created. As described above, reference runs 110 may comprise the baseline set of reports that are known to have generated correct outputs. Each report may comprise a plurality of files, and the files in the report may originate from various file formats. In some embodiments, reference runs 110, comprising reference inputs, the underlying logic, and reference outputs, are stored in database 116. Reference runs 110 may be configured by user 102 and/or automatically updated by unified regression platform 100.

Next, at step 306, the reports in reference runs 110 may be regenerated for the regression tests. As described above, regenerating reference runs 110 may comprise using the same inputs used to generate reference runs 110. A report in reference runs 110 may be tested with multiple input sets to determine that all input scenarios for the report are tested. In some embodiments, the report may be configured to calculate payroll data for employees for a company. The report may receive various inputs for employees and calculate a net pay and taxes for the employee for a year. As such, a first scenario may comprise inputs representing a low-income employee, and a second scenario may comprise inputs representing a high-income employee. The low-income employee may only be taxed at a single tax bracket while the high-income employee may be taxed at multiple tax brackets. If the reference inputs only comprised data for testing a low-income employee, the regression testing may miss errors caused by a more complex input data set. As such, it may be necessary for a single report to be tested with multiple test input sets when performing regression testing.

Once regression testing is completed, processing may proceed to step 308 where regression runs 112 are compared to reference runs 110. as described above, comparison 114 may comprise comparing any combination of file content 218, file name 220, preview 222, messages 224, analytics 226, or runtime 228. In some embodiments, if any of the above attributes in regression runs 112 do not match those in reference runs 110, regression status 212 may indicate an error or a failed document. In some embodiments, a threshold number of failures of the attributes is required for a report to fail regression testing.

Next, at step 310, the comparison results may be displayed. As described above, with respect to FIG. 2, comparison results may be displayed in a dashboard 108 for user 102. In some embodiments, for a failed file in a report, user 102 can open the reference run 110 and the regression run 112 side-by-side to view the error. In some embodiments, files are converted to a common format such that the files can be compared. This common format may then be displayed to user 102 for review.

Lastly, at optional step 312, an incident report may be prompted. In some embodiments, the incident report is prompted in response to a failed regression test. User 102 may communicate the incident report to the software vendor to indicate a software update affected the underlying logic for generating reports. In some embodiments, users 102 may screenshot the failed result and send the screenshot to the software vendor. In some embodiments, unified regression platform 100 automatically screenshots the relevant code and/or regression test results and alerts the software vendor. In some embodiments, users 102 may download the code for the file which failed and send the code to the software vendor. Broadly, any method of communicating a failed regression run 112 is considered herein. In some embodiments, incident reports are automatically created for user 102 and sent to the software vendor. Thus, the software vendor can investigate the incident and ship a patch to fix the generation of files.

Figure 4:
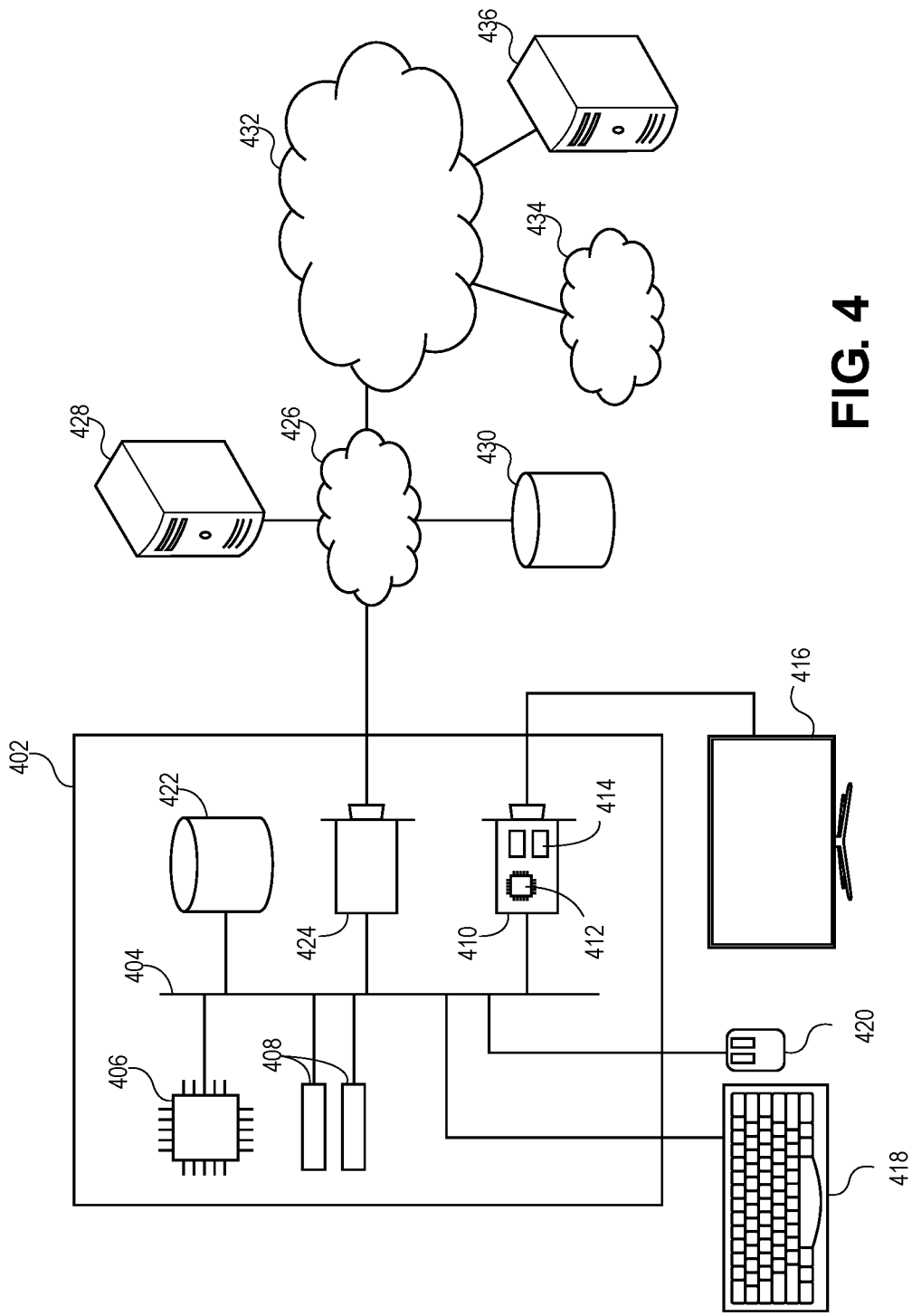
FIG. 4 depicts an exemplary hardware platform for certain embodiments.

Turning now to FIG. 4, in which an exemplary hardware platform for certain embodiments is depicted. Computer 402 can be a desktop computer, a laptop computer, a server computer, a mobile device such as a smartphone or tablet, or any other form factor of general- or special-purpose computing device containing at least one processor. Depicted with computer 402 are several components, for illustrative purposes. In some embodiments, certain components may be arranged differently or absent. Additional components may also be present. Included in computer 402 is system bus 404, via which other components of computer 402 can communicate with each other. In certain embodiments, there may be multiple busses or components may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also, on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, such as non-transitory computer readable media, and may be internally installed in computer 402 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the Institute of Electrical and Electronics Engineers (IEEE) 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 428, accessible on a local network such as local network 426, or remotely accessible over public Internet 432. Local network 426 is in turn connected to public Internet 432, which connects many networks such as local network 426, remote network 434 or directly attached computers such as computer 436. In some embodiments, computer 402 can itself be directly connected to public Internet 432.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the present teachings have been described with reference to the embodiments illustrated in the attached drawing figures, it is noted that equivalents may be employed, and substitutions made herein without departing from the scope of the present teachings as recited in the claims.

Having thus described various embodiments, what is claimed as new and desired to be protected by Letters Patent includes the following:

1. A computer-implemented method for unified regression testing, the computer-implemented method comprising:
   receiving, from a user, a first set of reference inputs for regression testing, the first set of reference inputs configured to test a first scenario;
   in response to receiving the first set of reference inputs, generating a first set of reference outputs using the first set of reference inputs;
   receiving, from the user, a second set of reference inputs for regression testing, the second set of reference inputs configured to test a second scenario;
   in response to receiving the second set of reference inputs, generating a second set of reference outputs using the second set of reference inputs;
   receiving, at a computing system associated with the user, a software update;
   in response to receiving the software update:
      regenerating the first set of reference outputs using the first set of reference inputs to obtain a regenerated first set of reference outputs; and
      regenerating the second set of reference outputs using the second set of reference inputs to obtain a regenerated second set of reference outputs;
   comparing the regenerated first set of reference outputs to the first set of reference outputs to determine if the software update affected the regeneration of the first set of reference outputs and to obtain a first set of comparison results;

comparing the regenerated second set of reference outputs to the second set of reference outputs to determine if the software update affected the regeneration of the second set of reference outputs and to obtain a second set of comparison results;

providing, to the user, the first set of comparison results and the second set of comparison results.

2. The computer-implemented method of claim 1, further comprising converting the first set of reference outputs and the regenerated first set of reference outputs to a common format for the comparison of the first set of reference outputs to the regenerated first set of reference outputs.

3. The computer-implemented method of claim 1, further comprising automatically generating at least one of the first set of reference inputs or the second set of reference inputs.

4. The computer-implemented method of claim 1, wherein the comparing the regenerated first set of reference outputs to the first set of reference outputs comprises comparing a runtime for generating the regenerated first set of reference outputs to a runtime for generating the first set of reference outputs.

5. The computer-implemented method of claim 1, wherein the comparing the regenerated first set of reference outputs to the first set of reference outputs comprises comparing regenerated contents associated with the regenerated first set of reference outputs to reference contents associated with the first set of reference outputs.

6. The computer-implemented method of claim 1,
wherein the first set of reference outputs are generated in a first output format,
wherein the regenerated first set of reference outputs are generated in a second output format, and
wherein the computer-implemented method further comprises:
converting the first set of reference outputs and the regenerated first set of reference outputs to a common intermediate format.

7. The computer-implemented method of claim 1, further comprising storing, in a persistence layer of a database, the first set of reference outputs and the second set of reference outputs.

8. The computer-implemented method of claim 1, further comprising if the comparison of at least one of the regenerated first set of reference outputs to the first set of reference outputs or the regenerated second set of reference outputs to the second set of reference outputs results in failure, automatically creating an incident report for reporting the failure.

9. One or more non-transitory computer-readable media storing computer-executable instructions that, when executed by a processor, perform a method for unified regression testing, the method comprising:
receiving, from a user, a first set of reference inputs for regression testing, the first set of reference inputs automatically generated for the user and configured to test a first scenario;
in response to receiving the first set of reference inputs, generating a first set of reference outputs using the first set of reference inputs;
receiving, from the user, a second set of reference inputs for regression testing, the second set of reference inputs automatically generated for the user and configured to test a second scenario;
in response to receiving the second set of reference inputs, generating a second set of reference outputs using the second set of reference inputs;
receiving, at a computing system associated with the user, a software update;
in response to receiving the software update:
regenerating the first set of reference outputs using the first set of reference inputs to obtain a regenerated first set of reference outputs; and
regenerating the second set of reference outputs using the second set of reference inputs to obtain a regenerated second set of reference outputs;
comparing the regenerated first set of reference outputs to the first set of reference outputs to determine if the software update affected the regeneration of the first set of reference outputs and to obtain a first set of comparison results;
comparing the regenerated second set of reference outputs to the second set of reference outputs to determine if the software update affected the regeneration of the second set of reference outputs and to obtain a second set of comparison results;
providing, to the user, the first set of comparison results and the second set of comparison results.

10. The media of claim 9, wherein the method further comprises receiving, from the user, at least one runtime threshold for monitoring a runtime of at least one of the regenerated first set of reference outputs or the regenerated second set of reference outputs.

11. The media of claim 10, wherein the method further comprises if the runtime of at least one of the regenerated first set of reference outputs or the regenerated second set of reference outputs exceeds the at least one runtime threshold, alerting the user.

12. The media of claim 9, wherein the method further comprises:
in response to providing, to the user, the first set of comparison results, receiving, from the user, a modification to the first set of reference inputs to obtain a modified first set of reference inputs;
regenerating the first set of reference outputs using the modified first set of reference inputs to obtain a modified first set of reference outputs; and
comparing the modified first set of reference outputs to the first set of reference outputs.

13. The media of claim 9, wherein the method further comprises suggesting, to the user, a document for regression testing, the document for regression testing selected based in part on an acceptance of a previous iteration of the document.

14. The media of claim 9, wherein the method further comprises if the comparison of at least one of the regenerated first set of reference outputs to the first set of reference outputs or the regenerated second set of reference outputs to the second set of reference outputs results in failure, automatically creating an incident report for reporting the failure, the incident report comprising a screenshot of associated code for regenerating the first set of reference outputs and the second set of reference outputs.

15. A system for unified regression testing, comprising:
a data store;
a processor; and
one or more non-transitory computer-readable media storing computer-executable instructions that, when executed by the processor, perform a method for unified regression testing, the method comprising:
receiving, from a user, a first set of reference inputs for regression testing, the first set of reference inputs configured to test a first scenario;

in response to receiving the first set of reference inputs, generating a first set of reference outputs using the first set of reference inputs;

receiving, from the user, a second set of reference inputs for regression testing, the second set of reference inputs configured to test a second scenario;

in response to receiving the second set of reference inputs, generating a second set of reference outputs using the second set of reference inputs;

receiving, at a computing system associated with the user, a software update;

in response to receiving the software update:
regenerating the first set of reference outputs using the first set of reference inputs to obtain a regenerated first set of reference outputs; and
regenerating the second set of reference outputs using the second set of reference inputs to obtain a regenerated second set of reference outputs;

comparing the regenerated first set of reference outputs to the first set of reference outputs to determine if the software update affected the regeneration of the first set of reference outputs and to obtain a first set of comparison results;

comparing the regenerated second set of reference outputs to the second set of reference outputs to determine if the software update affected the regeneration of the second set of reference outputs and to obtain a second set of comparison results;

providing, to the user, the first set of comparison results and the second set of comparison results.

16. The system of claim 15,
wherein the first set of reference inputs are configured to generate the first set of reference outputs according to a predefined report definition, and
wherein the second set of reference inputs are configured to generate the second set of reference outputs according to the predefined report definition.

17. The system of claim 16,
wherein the first scenario is configured to test a first set of logic for generating the first set of reference outputs for the predefined report definition, and
wherein the second scenario is configured to test a second set of logic for generating the second set of reference outputs for the predefined report definition.

18. The system of claim 15, wherein the method further comprises receiving, from the user, a notification profile, the notification profile comprising a notification location and a notification frequency for providing the first set of comparison results and the second set of comparison results.

19. The system of claim 15, wherein the method further comprises:
receiving, from the user, submission of the regenerated first set of reference outputs to a reporting authority;
receiving, from the reporting authority, acceptance of the regenerated first set of reference outputs; and
in response to receiving the acceptance of the regenerated first set of reference outputs, updating the first set of reference inputs based on the regenerated first set of reference outputs.

20. The system of claim 15, wherein the method further comprises converting the second set of reference outputs and the regenerated second set of reference outputs to a common format for the comparing the regenerated second set of reference outputs to the second set of reference outputs.

* * * * *